Dec. 10, 1929.                    G. NEVEU                    1,738,962
MAGNETO COUPLING
Filed Nov. 29, 1926
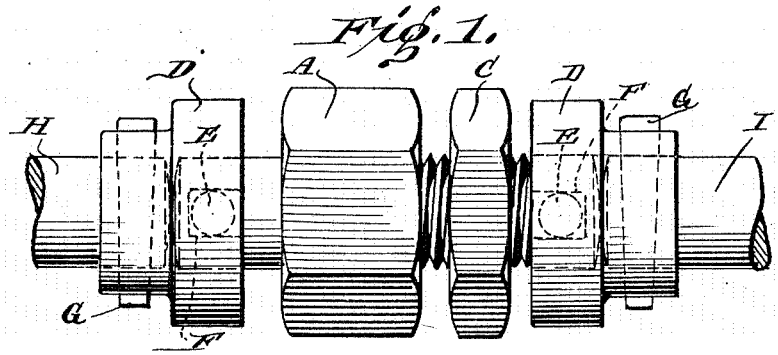
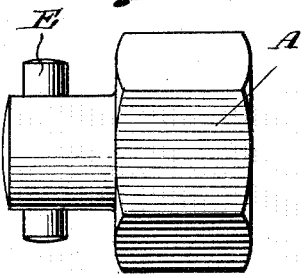
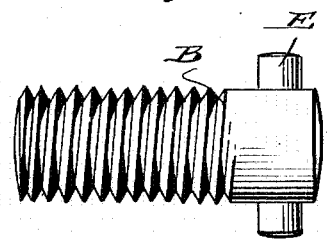
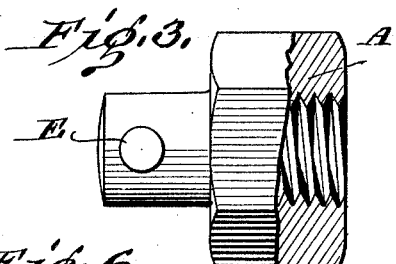
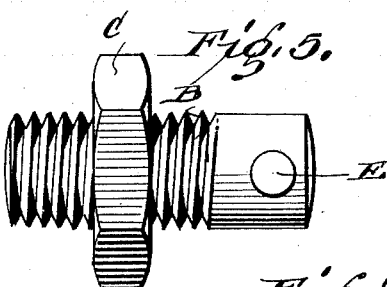
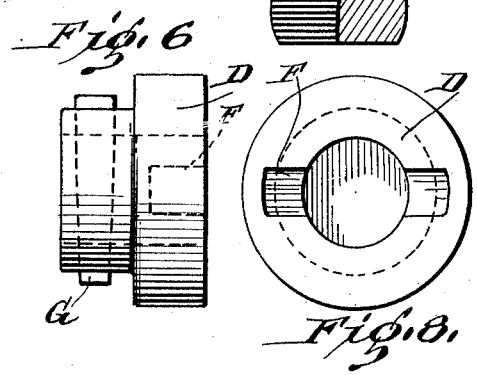
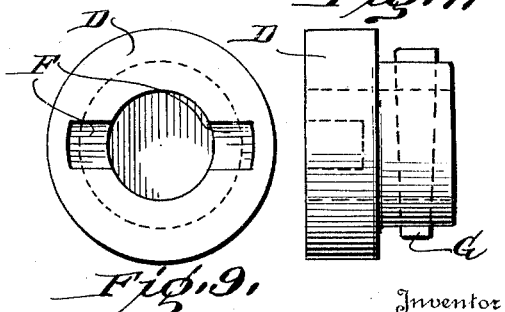
Inventor
Gustavo Neveu
By B. Singer
Attorney Patented Dec. 10, 1929

1,738,962

UNITED STATES PATENT OFFICE

GUSTAVO NEVEU, OF SANTIAGO, CHILE, ASSIGNOR OF FORTY PER CENT TO BERNARDO LUCHSINGER, OF SANTIAGO, CHILE

MAGNETO COUPLING

Application filed November 29, 1926, Serial No. 151,533, and in Chile September 26, 1926.

This invention relates to couplings for magnetos and the like for internal combustion engines.

The couplings which have been used up to the present for connecting the magneto, distributor or the like of internal combustion engines offer some inconveniences, chief of which is the difficulty to set the ignition. If perchance the ignition is set in advance or retarded, with the old type of coupling it becomes necessary to detach the magneto, or to loosen a series of bolts and nuts, which renders the adjustment difficult and toilsome.

The coupling of my invention tends to avoid such inconveniences by means of mechanical parts which, as devised, will render the adjustment and regulation of the ignition easy under all circumstances, without the removal of parts but only by loosening and tightening a nut, as will appear from the description below, as well as from the drawings, in which Fig. 1 is a general view of the coupling in which the various parts of same are shown assembled.

Figs. 2 and 3 are views of the main nut, with its coupling pin.

Fig. 4 is a view of the regulation bolt or screw.

Fig. 5 shows the bolt of Fig. 4, with the setting nut in place.

Figs. 6 and 7 are side views of the coupling elements by which the coupling itself is connected to the driving shaft or to the driven magneto or the like.

Figs. 8 and 9 are front views of the members shown in Figs. 6 and 7.

Entering into the details of the various members forming the coupling, A is the main coupling member in the form of a nut, provided at one end with a cylindrical projection which carries a transverse pin E. B is a screw or bolt, threaded for about three fourths of its length, as shown, and also provided with a transverse pin E. C is a lock nut which constitutes the member which locks the others in the position desired. D is an abutment—there being two—each of which carries a central opening and a transverse channel, as shown, the dimensions of which are as required by the shafts on which same are to be fixed.

These various elements are assembled as shown in Fig. 1, viz: Nut C is screwed on bolt B, and the latter in the main element A. One of the abutments D is connected to the member A and to the axle of the magneto or the like, and the other abutment is connected to the bolt B and to the shaft from which the driving power is to be obtained. Both abutments are fixed in their positions by pins, cotter pins or any other suitable means, such as tapered shafts with nuts.

The installation and adjustment of my improved coupling and the setting of the ignition is realized as follows: The engine is put as nearly as possible at its correct ignition point and the magneto is definitely placed in its mounting near the engine, the coupling of my invention being installed at the same time. Nut C is then screwed tightly against member A while at the same time bolt B is held against motion. All the various parts of the coupling now thus form a sole body. Upon the engine being started, it frequently happens that the ignition setting is too far ahead or too much behind. To correct this it shall only be necessary to stop the engine in order to loosen nut C from its engagement with element A, this being done by means of two wrenches. All the elements are now loose between each other. The setting of the engine's ignition may now be adjusted up to the smallest measure. This having been done, the nut C is again tightened while holding bolt B.

As can be appreciated, to obtain the exact setting of the ignition, it is unnecessary to detach the magneto from the automobile, aeroplane or any other vehicle of like nature, nor is it necessary to loosen a series of various means of attachment as used in present coupling devices of like class.

This is the most simple and exact coupling devised in the art, as it is of ready construction, easy to install and most efficient to effect the correct setting of the engine's ignition. It affords great flexibility between the various elements and can be used as an extension coupling between the various moving elements, as can readily be understood. Moreover, it will be appreciated that the axles may also be slightly out of line, and this will not interfere with the efficiency of the coupling.

It is evident that various minor changes can be introduced in the specific construction described, without departing from the spirit and scope of my invention. For instance, the connection with the drive and driven axles may be different, and the flexible connection of the three main elements of the coupling, namely members A, B and C with the abutments D may also differ from the pins E.

While I have herein shown and described a preferred form of my invention, I would have it understood that changes can be made in the form, construction and arrangement of the several parts without departing from the spirit of the invention as defined by my appended claims.

Having particularly described and ascertained the nature of my invention, I declare to claim as my exclusive property:

A flexible coupling of the class described, comprising a main nut, a bolt threadedly engaged in said nut and provided with a locking nut for engagement with the main nut to lock said bolt in adjusted position, said main nut and said bolt being each provided at the outer end with an extension having cylindrical lugs which project in opposite directions and abutment elements each arranged to receive and secure one end of a shaft member therein, said abutment elements having bores to receive the said extensions of the main nut and bolt and being also provided with recesses to receive the said lugs of said extensions so that said abutment members are connected to said main nut and bolt for angular movement with respect thereto.

In witness whereof I affix my signature.

GUSTAVO NEVEU.